(12) United States Patent
Mathieson

(10) Patent No.: US 6,941,523 B1
(45) Date of Patent: Sep. 6, 2005

(54) PRINTER DRIVER WITH AUTOMATIC INQUIRY OF USER PREFERENCE

(75) Inventor: Rono James Mathieson, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 397 days.

(21) Appl. No.: 09/587,629

(22) Filed: Jun. 5, 2000

(51) Int. Cl.⁷ .............................................. G09G 5/00
(52) U.S. Cl. ........................ 715/809; 715/810; 358/1.15
(58) Field of Search .............................. 715/809, 808, 715/776–777, 810, 835, 840, 764, 700, 961, 975; 358/1.15, 1.1; 345/809, 808, 777, 776, 976; 348/1.15, 1.1

(56) References Cited

U.S. PATENT DOCUMENTS

| | | | |
|---|---|---|---|
| 4,991,114 A | | 2/1991 | Kawamura et al. |
| 5,555,077 A | | 9/1996 | Schooley |
| 5,579,446 A | * | 11/1996 | Naik et al. ................... 358/1.9 |
| 5,706,411 A | | 1/1998 | McCormick et al. |
| 5,886,699 A | * | 3/1999 | Belfiore et al. ............. 345/843 |
| 5,963,216 A | * | 10/1999 | Chiarabini et al. ......... 345/660 |
| 6,067,560 A | * | 5/2000 | Potts, Jr. ..................... 709/203 |
| 6,076,076 A | * | 6/2000 | Gottfreid ....................... 705/45 |
| 6,268,924 B1 | * | 7/2001 | Koppolu et al. ............ 358/1.13 |
| 6,335,795 B1 | * | 1/2002 | Neuhard et al. ............ 358/1.15 |
| 6,362,892 B1 | * | 3/2002 | Lee et al. ................... 358/1.13 |
| 6,373,586 B1 | * | 4/2002 | Kim .......................... 358/1.15 |
| 6,504,556 B1 | * | 1/2003 | Myers ......................... 715/839 |
| 6,587,129 B1 | * | 7/2003 | Lavendel et al. ........... 345/776 |
| 6,631,010 B1 | * | 10/2003 | Foster et al. ............... 358/1.15 |
| 6,651,121 B1 | * | 11/2003 | Zurawski et al. ........... 710/100 |
| 6,687,741 B1 | * | 2/2004 | Ramaley et al. ............ 709/206 |
| 2004/0008217 A1 | * | 1/2004 | Livingston .................. 345/700 |

OTHER PUBLICATIONS

Microsoft Windows NT Screendumps (1 page, 1998).*
Acrobat Reader 4.0 Printing Command Icon ("Acrobat", Screendumps pp. 1–3, 1999).*
Netscape Communicator 4.61 Screendumps (pp. 1–3; 1999).*

* cited by examiner

*Primary Examiner*—Sy D. Luu
(74) *Attorney, Agent, or Firm*—Robert D. Varitz, P.C.

(57) ABSTRACT

A user interface for controlling peripheral devices including a peripheral option display for presenting peripheral options to a user immediately following selection of the peripheral device.

5 Claims, 4 Drawing Sheets

Fig. 1 *(PRIOR ART)*

PRINTER DRIVER WITH AUTOMATIC INQUIRY OF USER PREFERENCE

FIELD OF THE INVENTION

This invention relates to a peripheral user interface, and specifically to a user interface which negates the need for a user to launch a driver in order to make control changes in the peripheral.

BACKGROUND OF THE INVENTION

It is often difficult for users to set-up peripherals, and particularly peripherals, such as printers in an office network environment, to perform the jobs that the user wants to perform if the user is limited to using current, prior art "print driver" set-up method. The prior art requires the user to actively find and open the driver to control the advanced functions of the device. The problem with peripheral devices and the drivers therefor applies to print, fax, scan and multi-function peripheral (MFP) devices. For example, a user typically has only to click an icon on a task bar of an application, such as a Windows™ application which causes peripheral to proceed using preset, default parameters, without ever bringing up a driver user interface (UI). Alternatively, a user may select an option from within the "File" menu. At this point, the application presents a dialog box, which usually contains a "Properties" button that will bring up the driver UI. Only at this point may the user specify how the user would like the job to be performed by the peripheral device. Because of the difficulty of this approach, few users are able to take advantage of the capabilities of powerful modern office peripherals, or, may do so only with considerable effort.

In addition, considering the increased capabilities of modern office peripherals, a user may want and need to change settings often. For example, the user may want to print double sided documents and needs to be able easily to turn the duplex function on and off. Likewise, the user may need to turn a staple function on and off. Prior art devices force the user to go through the process of modifying the print driver as described above, which is inefficient and time consuming. Because of the complexity of modifying a print driver, the process is also error prone. Perhaps the most irritating aspect of modifying a printer driver is that the modification generally "sticks" —becoming a default setting, so that if the user has printed a document in duplex, landscape and stapled, the next document will also print in duplex, landscape and be stapled, unless the user remembers to reset the printer driver to more conventional settings, such a s simplex, portrait, no staple.

The prior art is illustrated in FIGS. 1–3. In FIG. 1, an application window is shown at 10. The first step of a print process requires the user to Click "File" 12, then select "Print" 14. It should be noted that, in many Windows™ applications, if the user clicks "Print" icon 16, the job is immediately sent to a printer, with no opportunity for the user to select any options. An application print UI, or "Print Menu" appears, as shown in FIG. 2 at 18. Note that this menu contains a "Properties" button 20. Clicking on "Properties" button 20 produces a printer driver UI, or "Properties Menu" 22 of FIG. 3, which provides access to five additional menus (Finishing, Effects, Paper, Destination, and Basics), each containing a variety of print options, such as "Duplex" 24, "Print Quality" 26, "Collate" 28, etc. The user must search through five menus, setting specific parameters, from each of the menus. Once the "Properties are set, the user must select "OK" on each of the five "Properties" menus, and then select "OK" on the "Print" menu.

U.S. Pat. No. 4,991,114 to Kawamura et al, for Printer comprising display means for displaying operation state thereof, granted Feb. 5, 1991, describes a user interface which only provides for status display.

U.S. Pat. No. 5,555,077 to Schooley, for Printer having an active user interface feature, granted Sep. 10, 1996, describes a user interface which is specific to a device rather than relating to the printer driver.

U.S. Pat. No. 5,706,411 to McCormick et al., for Printer status user interface and methods relating thereto, granted Jan. 6, 1998, only provides for status display and does not provide a user interface for setting of user preferences.

SUMMARY OF THE INVENTION

A user interface for controlling peripheral devices including a peripheral option display for presenting peripheral options to a user immediately following selection of the peripheral device.

An object of the invention is to provide a user interface which allows a user to select peripheral functions with a minimal number of actions.

Another object of the invention is to provide a user interface wherein a user is provided an option menu without directly accessing a driver.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

This invention solves the problems associated with prior art peripheral user interfaces (UI) by automatically placing a dialog box on the display after the user invokes an operation involving a peripheral device. While the invention may be used with printers, facsimiles, scanners or multi-function peripheral (MFP) devices, the examples herein will focus on the use of the invention with a peripheral printing device. The dialog box then presents print options to the user allowing the user to take advantage of the capabilities of the printer. For example, when the user clicks, or selects, the application print icon, a simple dialog appears offering choices such as number of copies, two-sided book style, two sided presentation style, staple and advanced features. The user then clicks one or two buttons to select the options.

The invention differs from the prior art in that prior art drivers, supplied by a peripheral vendor, ie., a printer driver, do not automatically place a dialog box on the screen when the user clicks on a "Print" icon on the command bar or when the user selects "File" "Print" "OK" The preceding sequence merely prints a job in accordance to the default or last selected parameters, which may not even be appropriate for the current print job, i.e., duplex on v. off; staple selected or not. The printing process is changed by the invention in that a software component supplied by a vendor of the peripheral device, when the device is selected, automatically places a dialog box on the screen, which dialog box offers a set of options for the peripheral device to the user, a peripheral device-specific driver. The software component may take the form of a modified peripheral driver, but may also be a modified Windows™ component, supplied by the vendor of the peripheral device, which functions similarly to a print drive.

Figure 1:
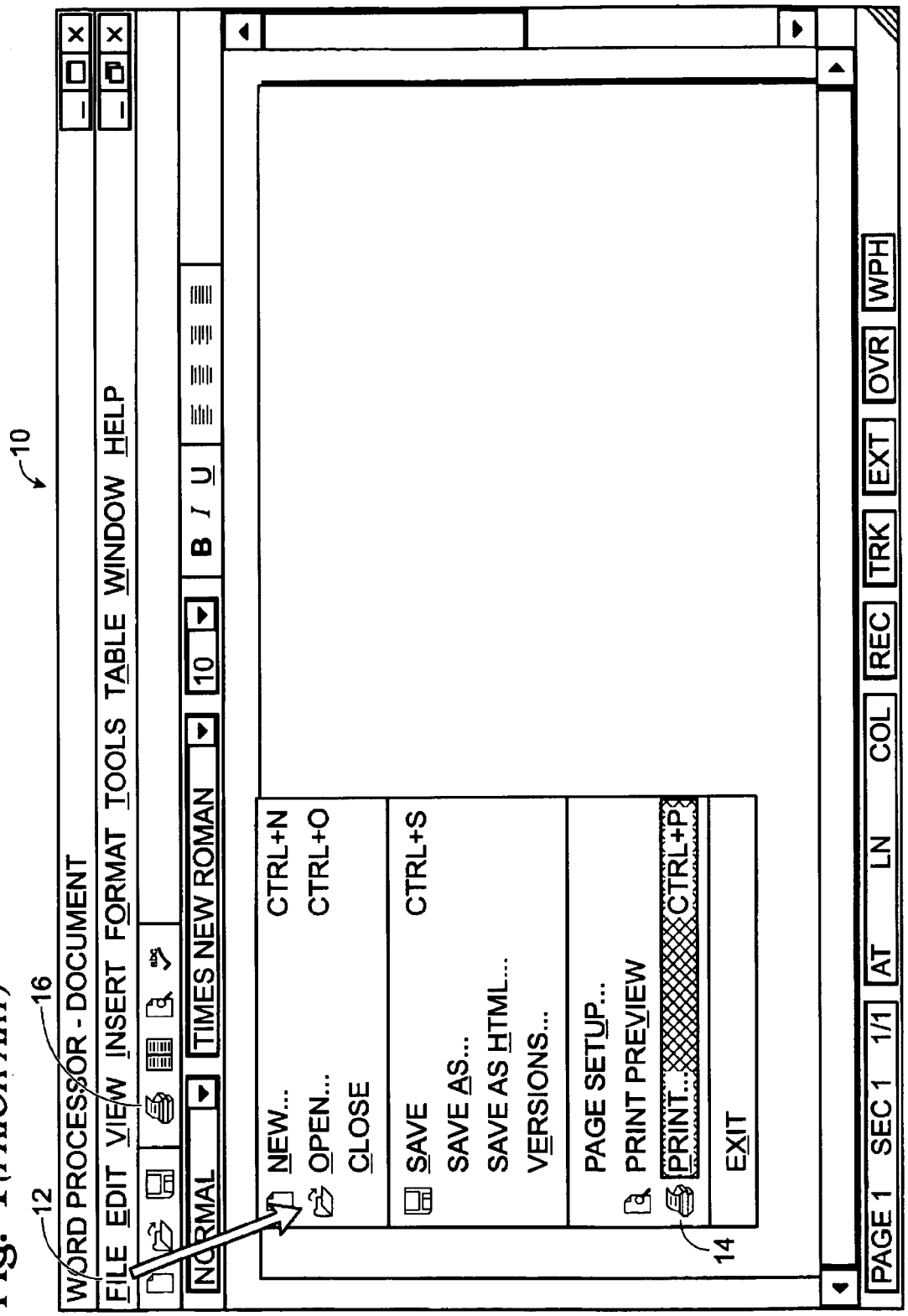
FIG. 1 is a prior art pull down File menu for MSWord 97®
Figure 2:
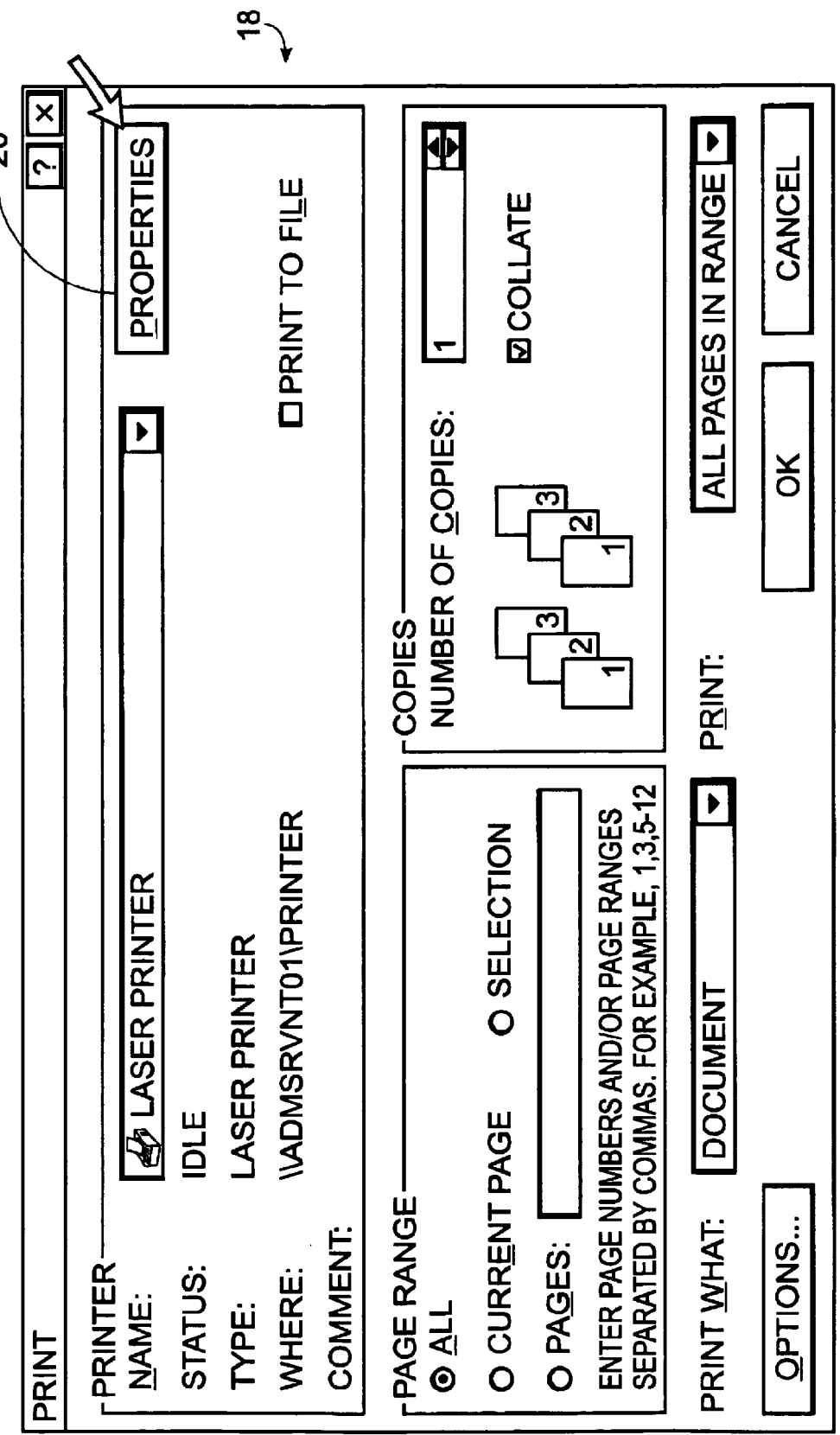
FIG. 2 is a prior art pull down Print menu for MSWord 97®
Figure 3:
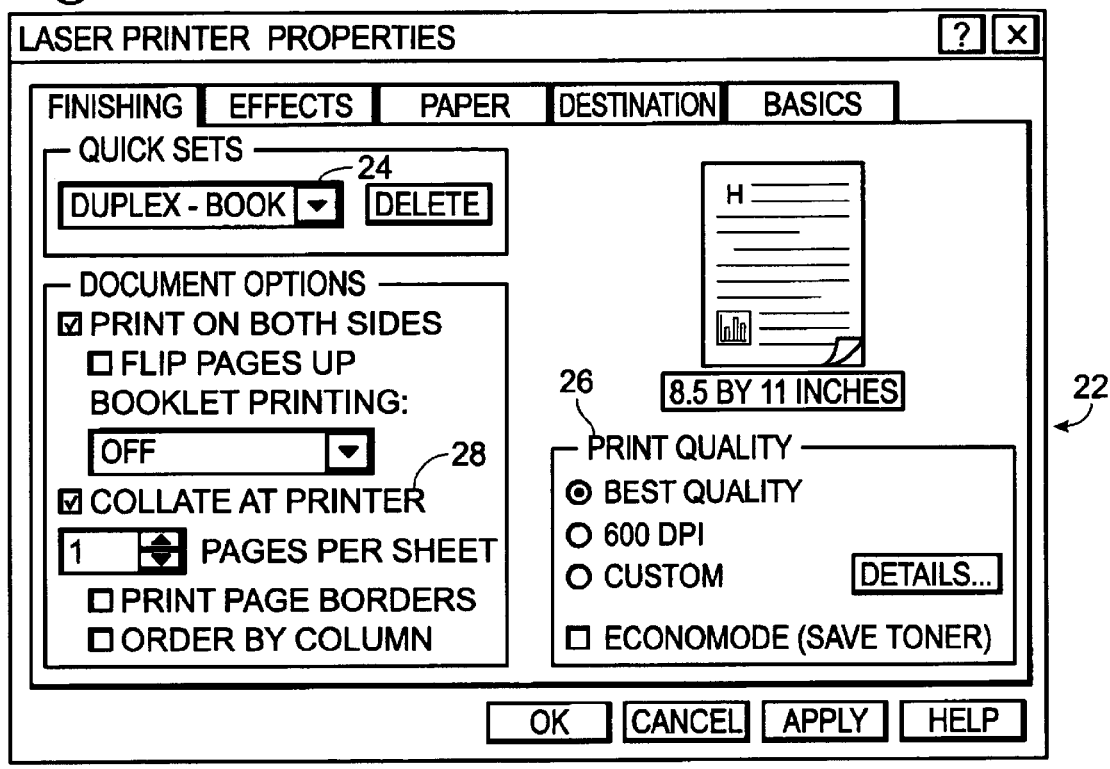
FIG. 3 is a prior art pull down Printer Properties menu for MSWord 97®
Figure 5:
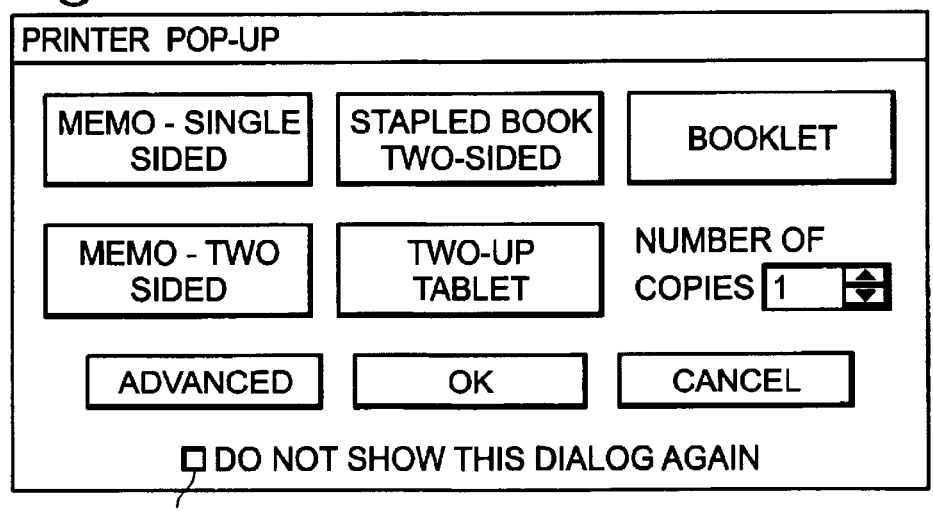
FIG. 5 is a print options screen of the invention.
Figure 4:
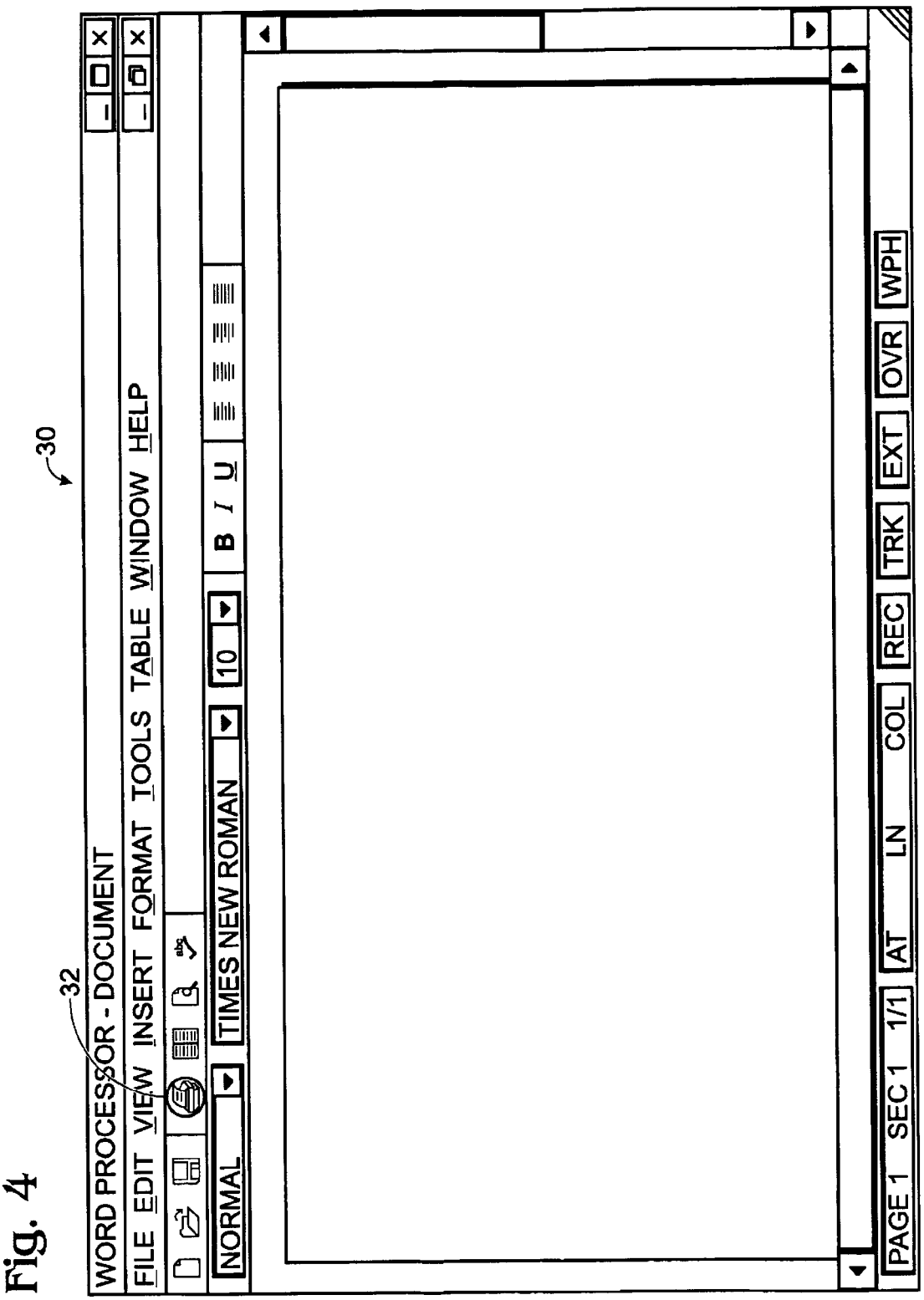
FIG. 4 is a print selection screen of the invention.

Referring now to FIGS. 4 and 5, an application window is shown generally at 30. Window 30 includes a print icon 32. A dialog box, or peripheral option display, 34 appears on the user's display immediately after icon 32 is selected and the application passes control of the printing operation to the driver. Dialog box 34 allows selection of user preferences to be made following the selection of a print command. As previously noted, prior art systems do not offer options to the user, and use only default settings when the user clicks the print icon on the task bar, or use the "File" "Print" "OK" sequence. The invention provides a fundamentally different printing process, especially in a Windows™ environment.

Dialog box 34 is a peripheral device-specific UI which is supplied by the print driver, or windows component replacement. Normally, the driver executes the print process using the current default settings, and does not present a dialog box to the user enumerating available choices. Because dialog box 34 is part of the print driver, it may pass instructions to the peripheral in the same way that would be done if the user selected the "File" "Print" "Properties" sequence, and then selected the parameters.

Dialog box 34 may be provided by an OEM, or may be customizable from within an existing printer driver, in the form of an add-on software component. For example, an existing print driver may offer a protocol for a user to set-up a predefined print format, i.e., duplex presentation in which two sided, landscape, tablet and staple are selected. Such a predefined print format may then be displayed as the names on the pop-up dialog buttons. This capability may be extended to allow a MIS department to determine, at the time when the MIS department establishes a customer account for the user, the set of buttons that appear for each user. In this way, advanced functionality may be delivered to a novice user. For example, a user may set up default, predefined print formats, and install such formats at the same time that the peripheral is installed on the user's PC. The user may also set up default, predefined print formats on a server, such as a Window® NT server. When the device is installed to the user's PC from the server, the default, predefined print formats are also installed and made available to the user.

The dialog would also typically contain an advanced settings button that would bring up the drivers full UI. The dialog typically will have a box that could be checked such as "Do not display this dialog again" 36 that would allow the user to de-select, or turn off box 34 if they do not wish to use it. If the dialog box is de-selected, clicking on "Print" icon 32 will result in the job being sent to the last selected printer with the last selected option set. It should be appreciated that, as used herein, and when dialog box 34 is not de-selected, "displaying peripheral options" means that the options, or menu, is displayed immediately—there is no need for the user to track through a long string of menu boxes to reach the "properties" box, and make the appropriate settings.

Thus, a system for providing an automatic inquiry of user preferences has been disclosed. It will be appreciated that further variations and modifications thereof may be made within the scope of the invention as defined in the appended claims.

I claim:

1. A user interface for providing an alternate means of printing a document on a computer to a printer comprising:
    a printer option display generated by the printer's device-specific options driver software for presenting printer-specific peripheral options to a user immediately following selection of the printer from a command bar icon in an independent vendor's PC application, wherein the independent vendor's PC application initiates the printing sequence activating the printer's device-specific options driver software, and wherein said printer option display includes a printer-specific user interface.

2. The interface of claim 1 which includes a bypass function for de-selecting said printer option display.

3. A user interface for providing an alternate means of printing a document on a computer to a printer comprising:
    a printer options display generated by the printer's device-specific driver software which automatically displays printer options in a printer option display including a printer-specific user interface to a user immediately following selection of a printer icon from a command bar in an independent vendor's PC application which includes access to a printer as a secondary function, wherein said printer options display includes a printer-specific user interface, wherein the independent vendor's PC application initiates the printing sequence activating the printer's device-specific options driver software.

4. The interface of claim 3 which includes a bypass function for de-selecting said printer option display.

5. A print device-specific user interface for providing an alternate means of printing a document on a computer to a printer comprising:
    a printer-specific driver which presents, upon selection of a printer icon, a print option device-specific display including a printer-specific user interface, wherein the independent vendor's PC application initiates the printing sequence activating the printer's device-specific options driver software; and
    a bypass function for de-selecting said printer-specific display.

* * * * *